(12) United States Patent
Lacaille

(10) Patent No.: US 10,832,227 B2
(45) Date of Patent: Nov. 10, 2020

(54) SYSTEM FOR POOLING DATA RELATING TO AIRCRAFT ENGINES

(71) Applicant: SAFRAN AIRCRAFT ENGINES, Paris (FR)

(72) Inventor: Jerome Henri Noel Lacaille, Rosny Sous Bois (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 433 days.

(21) Appl. No.: 15/564,901

(22) PCT Filed: Apr. 5, 2016

(86) PCT No.: PCT/FR2016/050766
§ 371 (c)(1),
(2) Date: Oct. 6, 2017

(87) PCT Pub. No.: WO2016/162622
PCT Pub. Date: Oct. 13, 2016

(65) Prior Publication Data
US 2018/0101825 A1 Apr. 12, 2018

(30) Foreign Application Priority Data
Apr. 9, 2015 (FR) ...................................... 15 53066

(51) Int. Cl.
*G06Q 10/00* (2012.01)
*B64F 5/60* (2017.01)
*B64D 45/00* (2006.01)

(52) U.S. Cl.
CPC ............... *G06Q 10/20* (2013.01); *B64F 5/60* (2017.01); *B64D 2045/0085* (2013.01)

(58) Field of Classification Search
CPC .... G06Q 10/20; B64F 5/60; B64D 2045/0085
See application file for complete search history.

(56) References Cited

U.S. PATENT DOCUMENTS

2008/0040152 A1* 2/2008 Vian .................. G05B 23/0221
705/2
2008/0195403 A1* 8/2008 Kollgaard .............. G06Q 50/30
705/1.1

(Continued)

FOREIGN PATENT DOCUMENTS

FR 2 971 595 A1 8/2012
FR 3 006 785 A1 12/2014

(Continued)

OTHER PUBLICATIONS

International Search Report dated Jun. 21, 2016 in PCT/FR2016/050766 filed Apr. 5, 2016.

(Continued)

*Primary Examiner* — Anne Marie Antonucci
*Assistant Examiner* — Sahar Motazedi
(74) *Attorney, Agent, or Firm* — Oblon, McClelland, Maier & Neustadt, L.L.P.

(57) ABSTRACT

A system for pooling observation data relating to aircraft engines includes a receiver adapted for recovering the observation data from distinct entities, a processor adapted for describing the observation data in a metric space by transforming them into measurable observation states, and a database adapted for storing therein the observation states.

13 Claims, 2 Drawing Sheets

(56) References Cited

U.S. PATENT DOCUMENTS

2013/0325286 A1   12/2013  Lacaille
2016/0140155 A1    5/2016  Bothier et al.

FOREIGN PATENT DOCUMENTS

WO     2008/141046 A1   11/2008
WO     2010/076468 A1    7/2010
WO     2012/110733 A1    8/2012

OTHER PUBLICATIONS

French Search Report dated Feb. 1, 2016 in FR 1553066 filed Apr. 9, 2015.

Lacaille, Jerome et al., "Visual Mining and Statistics for a Turbofan Engine Fleet," Aerospace Conference, 2011 IEEE, IEEE, Mar. 2011, XP031938160, pp. 1-8.

* cited by examiner

SYSTEM FOR POOLING DATA RELATING TO AIRCRAFT ENGINES

SCOPE OF THE INVENTION

This invention relates to the domain of aircraft engines. In particular, the invention relates to a system for pooling observation data relating to aircraft engines providing assistance for aircraft engine fleet management.

To each aircraft engine, corresponds a history comprising measurements of functioning parameters, alerts, interventions carried out on the engine, etc.

More specifically, during each flight, an aircraft proceeds with the recording and sending of information regarding its functioning according to a message system called ACARS (Aircraft Communication Addressing and Reporting System). These data are recovered by ground stations in real time to be immediately processed in the event of clear anomalies and otherwise to be archived by the airline with all data from the fleet. Other more complete data (for example, shaft rotation speeds, fuel flow, exhaust gas temperature, etc.) are also available, they can be recorded during the flight on embedded calculators and be regularly unloaded to supplement the information relating to the engines.

The different data coming from the messages received directly from different aircraft, or the data recovered on the ground from the internal memories of embedded calculators are archived by the airline.

These data are then viewed by experts to analyse and monitor the correct functioning of the engine.

However, the measurements taken on the engine are defined in a multidimensional space and are consequently, not simple to utilise.

Furthermore, anomalies or incidents on the engines are fortunately quite rare and when a specific symptom or unusual behaviour is detected on a given engine, the airline does not necessarily have enough history regarding the life of the engines to search for engines which have had similar behaviour in the past. Thus, it is not always possible for the airline to really determine potential damage and breakdowns of the engine and it can therefore be difficult to make predictions.

The aim of this invention is consequently to optimally utilise the observation data relating to aircraft engines, in order to best manage aircraft engine fleets and in particular, in order to predict and plan for maintenance work or operations with great accuracy, without having the aforementioned disadvantages.

AIM AND SUMMARY OF THE INVENTION

This invention relates to a system for pooling observation data relating to aircraft engines, comprising:
- a receiver adapted for recovering said observation data from distinct entities, said observation data comprising digital detection data coming from sensors and calculators embedded in aircraft engines,
- a processor adapted for describing said observation data in a metric space by standardising and by compressing digital detection data, thus transforming said observation data into measurable observation states, and
- a database adapted for storing therein said measurable observation states, thus constituting a learning model.

Thus, by recovering a large quantity of observation data, the system generates very specific learning models, a lot more specific than if each entity worked by itself to predict the development of engines. Indeed, given that aircraft engines are very secure and anomalies are fortunately rare, a given entity does not have sufficient data to be able to make specific and very reliable predictions about maintenance operations to carry out on an aircraft engine when an anomaly is detected. The pooling system of this invention allows measurements on a lot of physical parameters and on a large number of engines from distinct entities to be collected, pooled and utilised. It will be noted that "pooling" according to the invention does not only consist of pooling all these data, as these data cannot be utilised. Indeed, these data are highly assorted, they come from very different sources and there are lots of them, thus defining a multidimensional space where it is not theoretically possible to compare different data to each other. The pooling system transforms all observation data into measurable observation states, allowing for them to be compared and to be utilised. Thus, when an unusual behaviour is detected on an engine, the pooling system allows to provide for the development and the maintenance operations to be carried out on this engine or for the improvements to be made to engines in construction or in development, by utilising the knowledge of engine development, for engines which have had a similar symptom in the past.

Advantageously, said observation data comprise digital detection data coming from sensors and calculators embedded in aircraft engines, and/or aircraft engine configuration data, and/or descriptive data describing maintenance work or operations on aircraft engines.

Configuration data comprise types of engines and components. Descriptive data comprise maintenance operations carried out, symptoms, levels of damage and wear and tear observed during disassembly of engines. Digital detection data comprise measurements on endogenous variables describing the behaviour of the engine and the context of acquiring the measurements. Thus, the observation data supply very detailed and precious data allowing to supply after being processed, anticipative or general specific statistics about aircraft engines.

Advantageously, the system comprises:
- a receiver adapted for receiving a request from a requesting entity, said request comprising request data relating to observations connected to at least one aircraft engine,
- a processor adapted for describing said request in the metric space by transforming said request data into measurable request states,
- a processor adapted for searching for a response to said request by comparing according to a metric corresponding to the request, said request states to observation states stored in the database, and
- a transmitter adapted for transmitting said response to the requesting entity.

Thus, each entity gives its information, and in return, it benefits from the information from all the entities, and therefore indirectly benefits from the observations from the other entities. This system ensures a specific and efficient support service for the requesting entity, for managing its aircraft engine fleet.

Advantageously, the entity corresponds to an airline, each airline supplying observation data relating to its own aircraft engine fleet.

Advantageously, the entity can also correspond to a construction unit, maintenance unit, or aircraft manufacturer department.

Advantageously, the request is defined according to a model selected from among a set of predetermined request models in advance.

Advantageously, the processor is adapted for using a compression tool to reduce the number of dimensions of an observation space within which the observation data are described, thus transforming the observation space into said metric space within which the states are measurable and consequently, easily utilisable.

The compression tool can be based on at least one of the following techniques: parsimonious analysis, cartographic analysis, unsupervised classification analysis, main component analysis, and iterative calculation analysis.

Advantageously, the comparison comprises the calculation of a distance between at least one request state and the observations states stored in the database, said distance being selected from among the following distances: usual distance, binary distance, and edit distance measuring the similarity between different successions of states.

The distance allows to define a notion of proximity to search for elements in the database which have, in relation to the request elements, a difference less than a predetermined threshold.

Advantageously, the processor is adapted for presenting the response to the request in the form of anticipative and/or general statistical diagrams.

The distribution relating to the requesting entity can thus be represented in relation to the total distribution of all the entities. The identities of the entities, except for the requesting entity, are not displayed.

Advantageously, the response to the request comprises a list of past observations, similar to the observations defined in the request.

Thus, the future state of a given engine targeted by the request can be extrapolated using paths from other engines that have had similar behaviour to the given engine.

Advantageously, each one of the receivers and transmitters is secure. Thus, the communication of data between each one of the entities and the pooling system is secure.

Advantageously, the processor is adapted for an update of the database, therein recording request states as well as results of said requests.

Thus, new observation data are considered to further improve their responses to future requests.

BRIEF DESCRIPTION OF THE DRAWINGS

Other specificities and advantages of the system according to the invention will best emerge from reading the description made below, for information purposes but not exhaustively, in reference to the appended drawings, whereon.

DETAILED DESCRIPTION OF EMBODIMENTS

The principle of the invention consists of best utilising the observation data from engines in order to produce learning models allowing to deduce very specific general or anticipative statistics from them about the engines.

Figure 1:
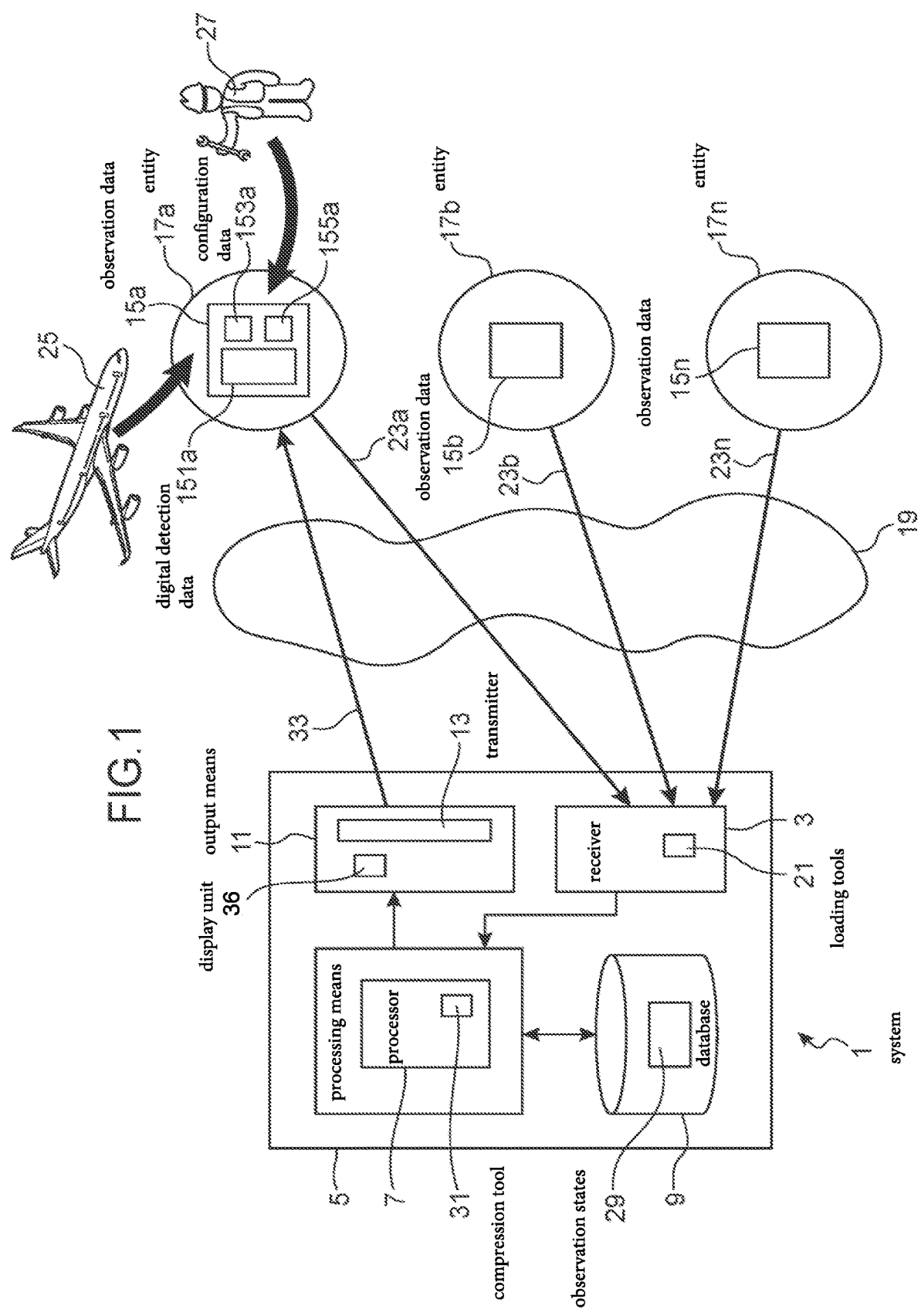
FIG. 1 illustrates a system for pooling observation data relating to aircraft engines, according to an embodiment of the invention.

FIG. 1 illustrates a system for pooling observation data relating to aircraft engines, according to an embodiment of the invention.

The pooling system 1 is implemented by an IT system usually comprising a receiver 3, processing means 5 comprising a processor 7, a database 9, and output means 11 comprising a transmitter 13.

The receiver 3 is adapted for recovering observation data 15a, 15b, 15n from the distinct entities 17a, 17b, 17n through a communication network 19. Advantageously, the receiver 3 comprises loading tools 21 to return all this information from different origins from the different entities 17a, 17b, 17n.

Each entity 17a, 17b, 17n can correspond to an airline supplying, by the intermediary of a secure communication link 23a, 23b, 23n, observation data 15a, 15b, 15n relating to its own aircraft engine fleet.

It will be noted that an entity 17a, 17b, 17n can also correspond to a manufacturing unit, maintenance unit, or a department of an aircraft manufacturer.

The observation data 15a, 15b, 15n can comprise digital detection data 151a, configuration data 153a from aircraft engines, and descriptive data 155a describing maintenance work or operations on aircraft engines.

The digital detection data 151a come from sensors and/or calculators embedded in aircraft engines.

Indeed, during a flight, an aircraft 25 proceed with recording digital detection data 151a relating to its functioning, as well as different environmental parameters. These digital detection data 151a come from measurements supplied by calculators and/or sensors integrated in the aircraft 25 and are recorded by embedded calculators (FADEC, ACMS, DAR, QAR, etc.). For example, FADEC (which controls the engine) records a certain number of variables measured by sensors integrated in the engine, both allowing to control the engine and to serve as a predictive maintenance procedure basis. These variables comprise rotation speeds, fluid temperatures and pressures in different locations of the engine, etc.

In general, an aircraft 25 regularly sends small, instant messages to the ground, comprising indicators or digital detection data coming from detection measurements. During each flight, the aircraft 25 sends at least two messages to the ground, one during the take-off and the other during the cruising phase. These messages are sent using an ACARS digital data transmission system between the aircraft 25 in flight and the ground.

The ground stations belonging to each entity 17a, 17b, 17n (airline and/or manufacturer) recover different messages sent on different dates for different aircrafts and for different engines. Furthermore, each airline regularly unloads the digital detection data 151a recorded during the flight onto embedded calculators to improve the information relating to the engines.

Thus, each airline has digital detection data 151a collected over time concerning its engine fleet. The digital detection data 151a are associated with acquisition dates, as well as identifiers of the engines in question, and therefore comprise data coming from messages received directly from different aircrafts, as well as data recovered on the ground from the internal memories of the embedded calculators.

Moreover, each airline also has configuration data 153a, as well as descriptive data 155a of maintenance operations on its aircraft engines.

In particular, each piece of work carried out on an engine, as well as the behaviour or symptoms which have led to this work, are recorded by a maintenance operator 27. This recording is made by using category-related coding relating to the types of engines, components, operations carried out, as well as to the symptoms. In particular, the types of engines are named by specific categories, to which the version number of the FADEC software is added. The components are naturally named by the categories and are identified according to the supplier and possibly the installation date. Moreover, the maintenance operations (for example, cleaning with water, performance restoration, changing a blade, etc.) are sorted into operation categories by the maintenance operator 27.

Thus, the receiver 3 is adapted for securely recovering observation data 15*a*, 15*b*, 15*n* comprising detection data 151*a*, as well as configuration data 153*a* and information 155*a* about the maintenance operations.

However, these observation data 15*a*, 15*b*, 15*n* recovered from the different entities, and in particular, the detection data 151*a*, cannot be easily utilised. They are described in a multidimensional observation space, of which the size is quite significant. Thus, in order to utilise the observation data 15*a*, 15*b*, 15*n* correctly, the processor 7 is adapted for describing them in a metric space by transforming them into measurable observation points or states 29.

More specifically, the processor 7 is adapted for reducing the number of dimensions of the observation space, within which the observation data 15*a*, 15*b*, 15*n* are described by using a compression tool 31. The compression tool allows the observation space to be transformed into a metric space, defining measurements that can be utilised. This tool 31 mainly serves to compress the digital detection data 151*a*, given that the other types of data (that is, configuration data 153*a* and descriptive data 155*a*) are of a lesser volume and are also already compressed according to a category-related coding, pre-established in advance. Each descriptive data from a maintenance operation and likewise, each configuration data can already be considered as a state. Thus, the descriptive and configuration data can be considered as measurable descriptive states and measurable configuration states respectively.

The compression tool 31 can be based on a technique known as parsimonious analysis, cartographic analysis, unsupervised classification analysis, main component analysis, and iterative calculation analysis, or other types of analyses. As an example, a compression tool according to a self-adaptive cartographic technique is described in the international patent application WO2012110733 by the applicant.

It will be noted that the observation data 15*a*, 15*b*, 15*n* can initially be returned and stored in the database 9 or in a specific data pool before they are processed by the processor 7. In any case, the database 9 definitively comprises the observation states 19 processed by the processor 7.

It will also be noted, that at the start, the database 9 is advantageously initialised with preliminary observation data corresponding to initial observation data. These data come from the manufacturer (as an entity), in particular using observations describing damage recorded by maintenance operators, as well as experts' knowledge, for example regarding links between the symptoms and the maintenance operations.

Moreover, before the compression of the detection data 151*a*, the processor 7 is advantageously adapted for pre-processing the detection data 151*a* beforehand, in order to remove the impact of outside conditions and instructions on variables describing the state of the engines. Indeed, the context of data acquisition can vary a lot. For example, the measurements concerning the take-off acquired during a first flight of the day where the engine is started when cold, can be different from those acquired during other flights in the day. Other examples concerning the variation in weather conditions (rain, snow, ice, etc.), the change of pilots, the aircraft flyover location (that is, above the sea, the desert, land, etc.). All these effects can, of course, have an impact on the measurements.

More specifically, the digital detection data 151*a* comprise measurement on endogenous variables describing the behaviour of the engine and the measurements on exogenous variable describing the acquisition context.

As an example, endogenous variables can comprise the rotation speed of each blade, the fuel flow, fluid temperatures and pressures before and/or after compression, exhaust gas temperature, etc.

Exogenous variables can comprise the following variables: outside temperature, altitude, aeroplane weight, state of the wing defrosting system, state of the engine's air inlet defrosting device, state of the flush valve, state of the drain valve, position of the variable geometry stator, engine system, state of the bleed air valves, position of the thrust controller, speed of the aeroplane, etc.

Thus, for each engine, the measurements relating to the endogenous variables are standardised by considering the measurements relating to the exogenous variables to form, at each acquisition, standardised detection data from the engine. The detection states coming from these standardised detection data are represented independently from the acquisition context, in a measurable space, of which the size is equal to the number of endogenous variables. A standardisation technique is described in the international patent application WO2010076468 by the applicant.

Finally, the database 9 contains a plurality of observation states 29 comprising standardised detection states, as well as configuration states and descriptive states. This set of observation states 29 thus constitutes a specific and solid learning model, so that the database can thus be consulted to produce anticipative or conditional statistics.

Indeed, the pooling system 1 is configured to receive requests through the communication network 19 from each entity 17*a*, 17*b*, 17*n* and to search for responses to these requests, using the observation states 29 stored in the database 9.

More specifically, the receiver 11 is adapted for receiving a request through the intermediary of a secure communication link from any requesting entity. The request comprises fields wherein the request data relating to observations connected to at least one aircraft engine that has an interest for the requesting entity are provided. The processing of the request consists of searching, for example, for elements in the database 9 which are close to or associated with corresponding data or elements, provided in the request fields. An element provided in a request can be a symptom, a maintenance operation, a result after recovery, a specific event, etc. The information requested concerns, for example, the components involved in a symptom, the potential damage and the repair costs, the ranking of the entity in relation to a specific event, etc. This information allows the requesting entity to best manage its engine fleet.

Advantageously, the requests are formatted in advance, so that each request can be defined according to a model selected from among a set of predetermined or pre-programmed request models.

After receipt of a current request, the processor 7 is adapted for describing it in the metric space, by transforming the request data into measurable request states. This transformation can be made by using a compression tool 31 like the one indicated before.

Furthermore, the processor 7 is adapted for searching for a response to the current request by using a similarity search algorithm. As an example, the processor 7 implements a similarity search, by comparing according to a metric corresponding to this request, the request states to the corresponding observation states stored in the database 9. The comparison comprises the calculation of a distance between at least one request state and the corresponding observation states. This distance can be a usual distance (for example, a Euclidean distance), a binary distance, an edit distance (or Levenshtein distance) measuring the similarity between different successions of states, or other types of distances.

In this case, the response to a current request comprises elements in the database 9 which have, in relation to the request elements, a distance less than a predetermined threshold.

Advantageously, the processor 7 is adapted for using an unsupervised classification algorithm (clustering) to split the results from each request into similar categories. This split allows the processor 7 to present the response to the request in the form of anticipative or general statistical diagrams.

For example, the response to the request comprises a distribution of an event relating to the requesting entity in relation to the distribution of the other entities without indicating the identities of the entities, except for the requester's identity. It can also comprise a list of past observations, similar to the observations defined in the request, by sorting, for example, the elements from the list, from the most relevant to the least relevant, etc.

Finally, the transmitter 13 is adapted for transmitting the response through the intermediary of a secure communication link 33 to the requesting entity.

Advantageously, the output means 11 comprise a display unit 36 adapted for displaying the response transmitted to the requesting entity, such as it will be definitively displayed on a screen of an IT system of the requesting entity.

Furthermore, the processor 7 is advantageously adapted for updating the database 9 by recording therein the request states received over time, as well as the results of these requests. The request states and results from new observation data, thus allowing the precision of the responses to future requests to be increased further.

Figure 2:
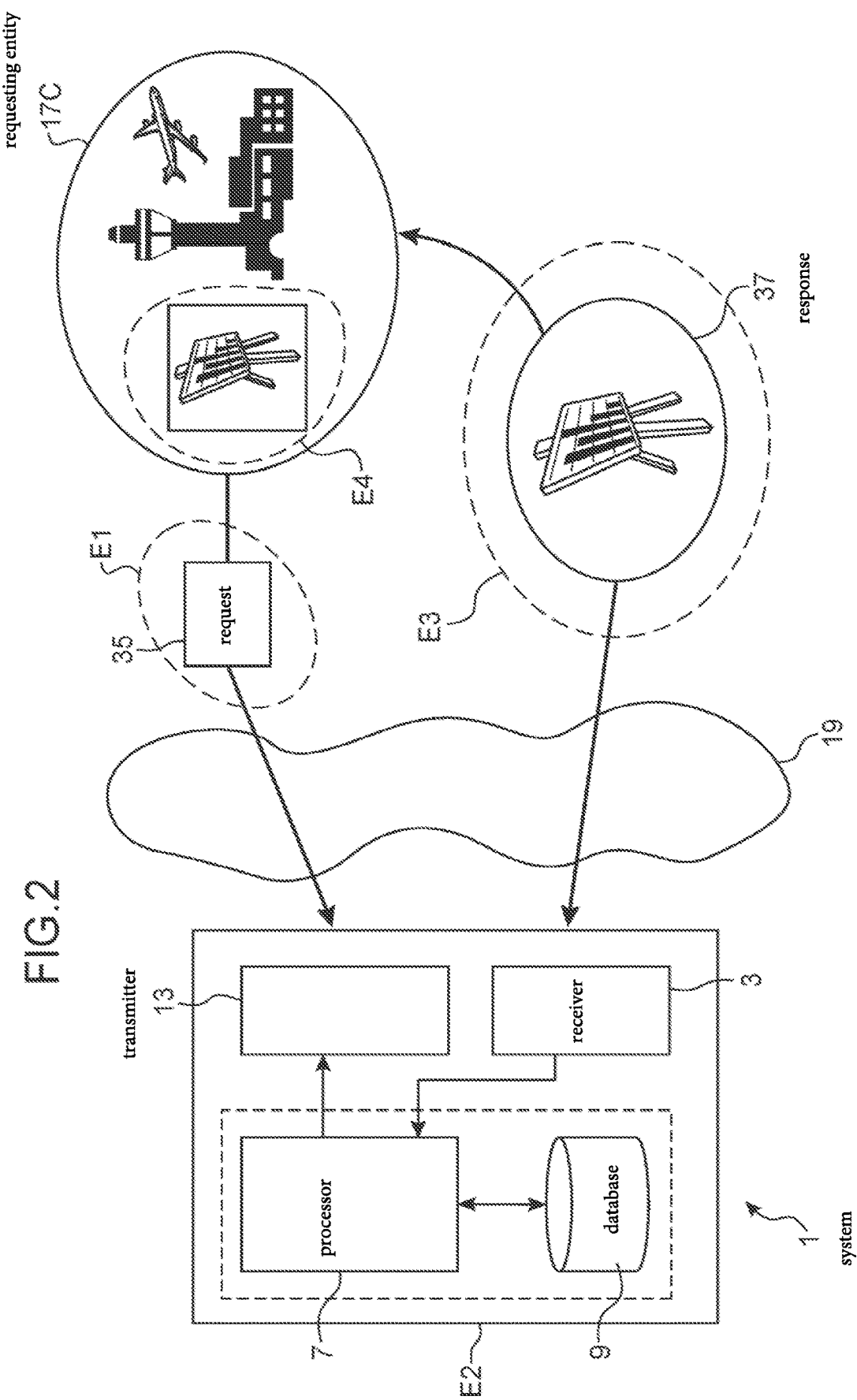
FIG. 2 schematically illustrates an example of a support service method implemented by the pooling system according to the invention.

FIG. 2 schematically illustrates an example of a support service method implemented by the pooling system according to the invention.

According to this method, a requesting airline 17c examines the pooling system 1 to have statistics on the symptoms or maintenance operations carried out on an engine.

More specifically, at step E1, the airline 17c transmits a request 35 concerning a specific symptom observed on one of its engines and asks to know about the development of the engines which have had a similar symptom in the past.

At step E2, after receiving the request 35, the processor 7 describes this request in the metric space and uses an appropriate distance to search in the database 9 for the development of the engines which have had a similar behaviour to that provided in the request 35. For example, an edit distance measuring the similarity between the different paths formed by the observation states of the engines can be used. Indeed, each piece of path of an engine corresponds to a chain of characters (category labels) and thus, the edit distance is highly adapted for measuring the similarity between two chains of characters. The future state of the engine targeted by the request 35 is thus extrapolated using paths from the other engines which have had similar behaviours. The processor 7 can also search for the environment favouring this type of symptoms or events, and the probable causes, as well as the repair costs.

Furthermore, the processor 7 uses datamining techniques to determine statistics on the frequency of this type of events according, for example, to the operational sectors for the aircrafts (sandy environment, polluted, marine, continental), as well as the statistics, rankings, and in particular, the ranking of the requesting airline 17c for this event, compared with the other airlines or compared to the whole global fleet. Of course, the identities of other airlines will be masked. As an example, the response can comprise a representation of scatter-plots, where the operations of the requesting airline 17c are of a different colour to those of other airlines.

At step E3, a response 37 comprising all the results found at the previous step is sent to the requesting entity 17c. All these results can be represented according to a multitude of diagrams comprising curves, bars, scatter-points, etc.

At step E4, the requesting airline 17c recovers the response 37 to, for example, display it on a screen of an IT system. Using this response, the airline 17c can best determine the potential damage, risks and breakdowns of the engine in question, and consequently, can best plan for maintenance operations or the maintenance strategy. Furthermore, the requesting airline can be located among all the other airlines, and can thus evaluate its management of its engine fleet.

Thus, by bringing its own information, the airline in return indirectly benefits from the information from all the airlines. The pooling system thus makes sure that each airline has a specific and efficient support service (back office), providing it with precious assistance to manage its aircraft engine fleet.

Moreover, it will be noted that access to the information can be regulated, according to the type of requesting entity or the link between the entity and the manufacturer. Certain entities can only access general information, whereas others can have a lot more detailed information.

The pooling system, according to the invention, thus supplies an intelligent interface for the utilisation of assorted observation data, coming from different sources and which, at the start, could not be utilised. This system is adapted for making all these data comparable and consequently allows, statistics, rankings, as well as predictions to be produced.

The invention claimed is:

1. A system for pooling and utilising observation data relating to aircraft engines, the system comprising:
   a receiver configured to recover said observation data from distinct entities, said observation data comprising digital detection data coming from sensors and calculators embedded in the aircraft engines;
   a processor configured to describe said observation data in a metric space by standardising and by compressing the digital detection data, thus transforming said observation data into measurable observation states;
   a database to store therein said measurable observation states, thus constituting a learning model; and
   a transmitter, wherein
   the receiver is configured to receive a request from a requesting entity, said request comprising request data relating to observations connected to at least one aircraft engine of the aircraft engines,
   the processor is configured to describe said request in the metric space, by transforming said request data into measurable request states, and search for a response to said request by comparing said request states to said measurable observation states stored in the database, according to a metric corresponding to the request, and the transmitter is configured to transmit said response to the requesting entity.

2. The system according to claim 1, wherein said observation data comprise configuration data from the aircraft engines, and/or descriptive data describing maintenance work or operations on the aircraft engines.

3. The system according to claim 1, wherein said distinct entities correspond to airlines, each airline supplying said observation data relating to its own aircraft engine fleet.

4. The system according to claim 1, wherein an entity of said distinct entities corresponds to a construction unit, maintenance unit, or department of an aircraft manufacturer.

5. The system according to claim 1, wherein said request is defined according to a model selected from among a set of request models, predetermined in advance.

6. The system according to claim 1, wherein said processor is configured to use a compression tool to reduce a number of dimensions of an observation space within which the observation data are described, thus transforming the observation space into said metric space, defining measurements that can be utilised.

7. The system according to claim 6, wherein said compression tool is based on at least one of the following techniques: parsimonious analysis, cartographic analysis, unsupervised classification analysis, main component analysis, and iterative calculation analysis.

8. The system according to claim 1, wherein said comparison comprises calculating a distance between at least one request state of the request states and said measurable observation states stored in the database, said distance being selected from among the following distances: usual distance, binary distance, edit distance measuring the similarity between different successions of states.

9. The system according to claim 1, wherein said processor is configured to present the response to the request in a form of anticipative or general statistical diagrams.

10. The system according to claim 1, wherein said response to the request comprises a list of past observations similar to the observations defined in the request.

11. The system according to claim 1, wherein both the receiver and the transmitter are secure.

12. The system according to claim 1, wherein said processor is configured to update the database by recording therein the requests received, as well as results of the requests.

13. A method for pooling and utilising observation data relating to aircraft engines, the method comprising:
recovering, by a receiver, said observation data from distinct entities, said observation data comprising digital detection data coming from sensors and calculators embedded in the aircraft engines;
describing, by a processor, said observation data in a metric space by standardising and by compressing the digital detection data, thus transforming said observation data into measurable observation states;
storing, in a database, said measurable observation states, thus constituting a learning model;
receiving, by the receiver, a request from a requesting entity, said request comprising request data relating to observations connected to at least one aircraft engine of the aircraft engines;
describing, by the processor, said request in the metric space, by transforming said request data into measurable request states, and searching for a response to said request by comparing said request states to said measurable observation states stored in the database, according to a metric corresponding to the request; and
transmitting, by a transmitter, said response to the requesting entity.

* * * * *